Feb. 10, 1948.    J. L. CLARKSON    2,435,673
CLUTCH CONTROL DEVICE
Filed Oct. 30, 1942    3 Sheets-Sheet 1

INVENTOR;
JOHN L. CLARKSON
BY Rodney Bedell
ATTORNEY

Feb. 10, 1948. J. L. CLARKSON 2,435,673
CLUTCH CONTROL DEVICE
Filed Oct. 30, 1942 3 Sheets-Sheet 3

INVENTOR;
JOHN L. CLARKSON
BY Rodney Bedell
ATTORNEY

Patented Feb. 10, 1948

2,435,673

UNITED STATES PATENT OFFICE 2,435,673

CLUTCH CONTROL DEVICE

John L. Clarkson, Nashville, Ill.

Application October 30, 1942, Serial No. 463,917

10 Claims. (Cl. 192—99)

The invention relates to the operation of a clutch or clutch-like structure and is particularly adapted for use in connection with heavy machinery such as required for reeling cable on a machine to be operated from a remote power source.

One of the objects of the invention is to simplify the operation of the reel drive, or a clutch therein, so that the driving mechanism may be readily placed and held in functioning position or in non-functioning position by the manual shifting of an operating member without requiring the locking of the same or constant attention from a workman. This object is attained by a simple operating structure including a toggle, arranged to hold the operating member and associated parts in one position, and a spring normally holding the operating member and associated parts in another position.

It is another object of the invention to house portions of the drive so that they may be protected from dirt, moisture, etc., and, preferably, so that opposing parts of the device adapted to be thrust into frictional engagement with each other may operate in oil to facilitate slippage under certain conditions.

At the same time, the parts should be readily accessible for occasional inspection and such adjustment as is necessary to maintain the efficiency of the mechanism, and it is another object of the present invention to facilitate access to the enclosed parts of the drive by mounting the above-mentioned control member on a removable casing wall and associating it with the enclosed parts so that it is unnecessary to manipulate any assembling elements other than those holding the removable wall to the remainder of the casing body.

In the accompanying drawings illustrating my invention—

Figure 1:
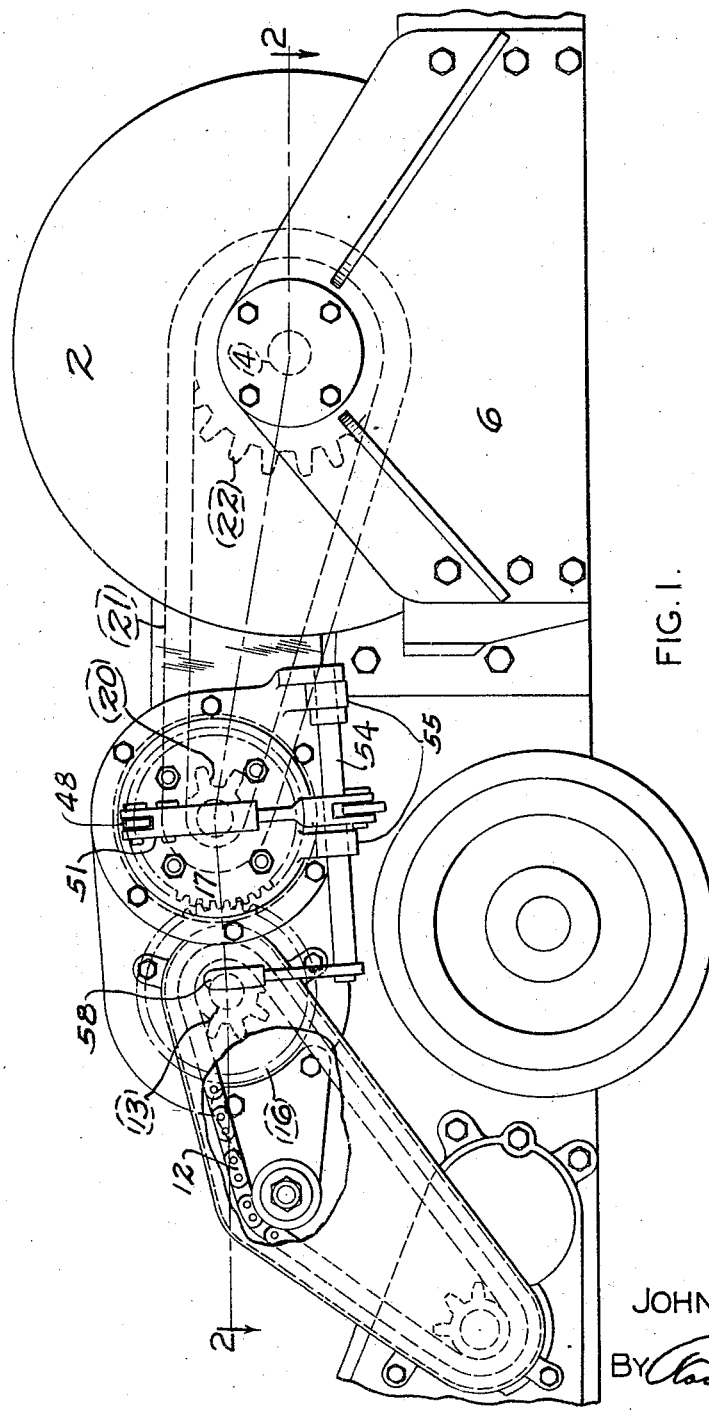
Figure 1 is a side elevation of the reel and reel drive of a mining machine of the class described.
Figure 2:
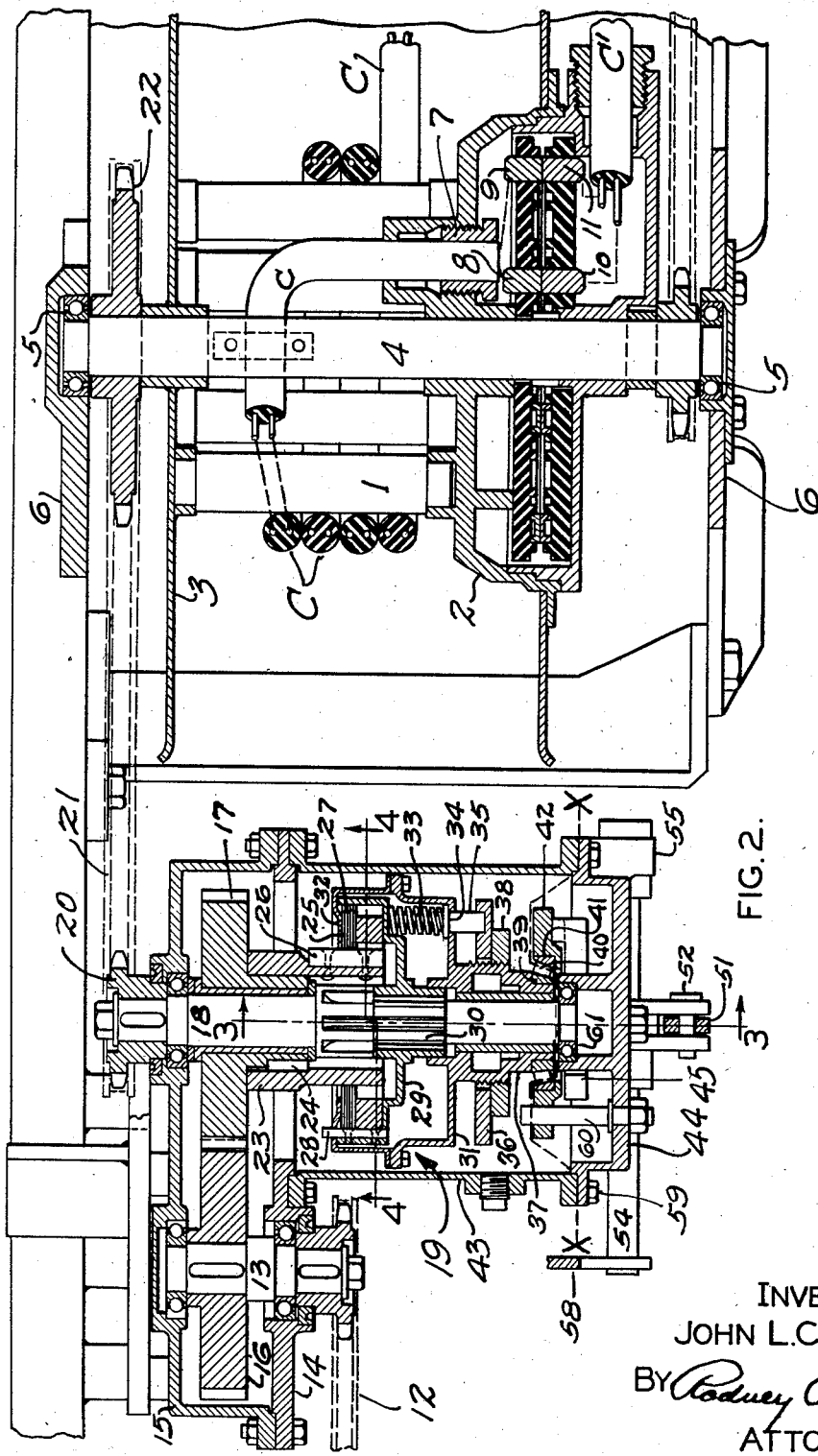
Figure 2 is a longitudinal horizontal section through the structure shown in Figure 1 and is taken substantially on the line 2—2 of Fig. 1.

The mechanism illustrated in Figure 1 comprises a portion of a mining machine of the type shown in Patent No. 1,904,355, issued April 18, 1933, to the present inventor and including conveying mechanism, gathering mechanism and traction mechanism operated by respective motors driven by current from a suitable source of supply remote from the area in which the machine is positioned. The mechanisms and motors referred to are not shown in the drawings, but the cable for the current driving the motors is indicated at C (Figure 2) and this cable is wound onto or unwound from a reel including a drum portion 1 and sides 2 and 3 fixedly secured to a reel shaft 4 journalled in suitable bearings 5 on the machine frame, portions of which are indicated at 6. The inner end of cable C is anchored at 7 to the reel side member 2 and the cable wires are connected respectively to annular rings 8 and 9 which contact stationary rings 10 and 11 respectively to which are connected the wires of a cable C' leading to the various motors of the machine mechanisms or to switches by which the circuits for such motors are controlled.

One of the motors (not shown) is connected by a sprocket chain 12 to a shaft 13 journalled in housing members 14 and 15 detachably secured to each other and mounted on the machine frame or one of the members may be an integral part of the frame. A gear 16 fixed on shaft 13 meshes with a gear 17 freely rotatable on a shaft 18, but gear 17 is adapted to be operatively connected to shaft 18 by a releasable clutch, indicated generally at 19 in Figure 2 with parts detailed in Figures 3 and 4. A drive sprocket 20 on shaft 18 is connected by a chain 21 to a driven sprocket 22 on reel shaft 4.

An extension 23 keyed at 24 to gear 17 mounts a series of discs 25 keyed at 26 to the extension and alternating with relatively rotatable discs 27 keyed at 28 to a backing member 29 splined at 30 to shaft 18.

A box 31 is normally rotatable on shaft 18 and includes an inner wall 32 forming a backing member opposing backing member 29. Three or more coil springs 33, seated against the outer face of member 29, bear against collars 34 on pins 35 and urge the pins to the right (Figure 3) so that the collars engage the inner face of the end wall of box 31 and thrust member 31 to the right so that its wall 32 moves the discs into frictional engagement with each other. (It will be understood that backing member 29 is held against movement to the left by its abutment with the shoulder on shaft 18.) This causes member 29, shaft 18 and sprocket 20 to rotate with extension 23 and gear 17. These details of the frictionally interengaging discs and their sliding mounting on associated driving and driven parts are well known in the art and are not novel in themselves.

The spring pressure thrusting the discs into engagement with each other may be adjusted by a plate 36 slidable over a boss 37 and engaging the outer ends of pins 35. The plate is held against movement away from the transverse wall of the box by an adjusting nut 38 threaded on the boss. If box 31 be positively moved to the left against the thrust of springs 33, the pressure on discs 25 and 27 will be relieved and they may rotate relative to each other to disengage the clutch. To effect such movement, boss 37 is provided with the inner race 39 of a radial and axial thrust antifriction bearing (Figure 2), the rolling elements of which are indicated at 40. The outer race 41 of the bearing is seated in a push ring 42. All of the above-described clutch and clutch operating structure is surrounded by a casing 43 having a detachable head 44.

Also within casing 43 is a yoke 45 (Figure 3) pivoted at 46 to the inner face of casing head 44 near one side of the casing and extending across the casing and provided intermediate its ends with projections 47 arranged to engage diametrically opposite points on push ring 42. A push rod 48 is slidably mounted in a stuffing box 49 on the casing head and is shouldered at 50 to engage the swinging end of yoke 45. A shifting lever 51 is fulcrumed at 52 to a bracket 53 on the outer face of casing head 44 and has its upper arm pivotally connected to the outer end of rod 48. A crank shaft 54 is journalled in spaced bearings 55 on casing head 44 and is provided with an arm 56 pivotally connected by a link 57 to the other arm of lever 51. An operating handle 58 is secured to the outer end of shaft 54.

Elements 54, 56 and 58 form a manually operated bell crank lever. Elements 56 and 57 comprise toggle arms and, when handle 58 is moved manually to the position shown in full lines, the toggle rotates lever 51 in a counterclockwise direction, shifting rod 48, yoke 45, push ring 42, box 31, nut 38 and plate 36 to the left (Figure 3), thus freeing discs 25 and 27 of pressure from springs 33.

Figures 3, 4:
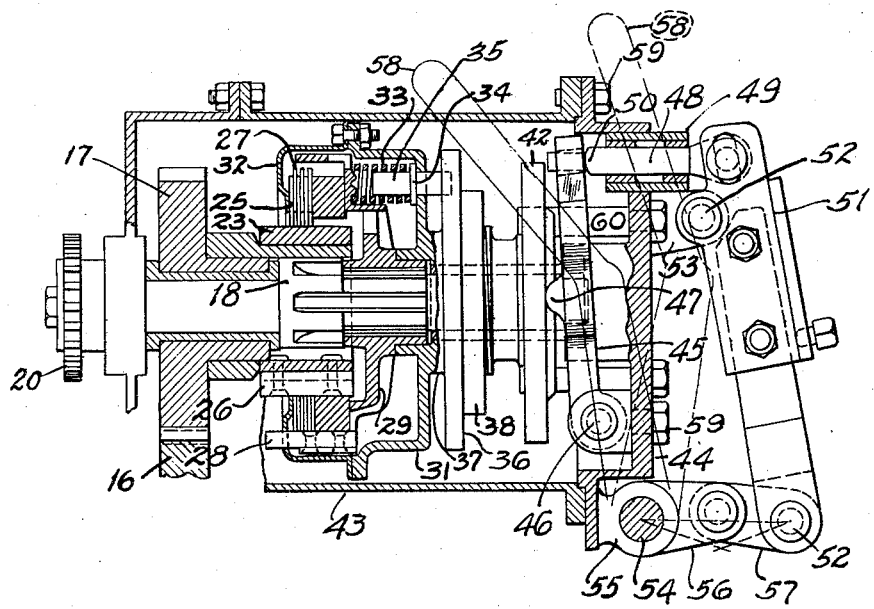
Figure 3 is a transverse section taken on the line 3—3 of Figure 2 but showing the driving parts disengaged.
Figure 4 is a detail section taken on the line 4—4 of Figure 2.

When the parts are in the position shown in Figure 3 the toggle knuckle is above the straight line between the outer pivotal ends of links 56, 57 and therefore the toggle is set or locked against downward movement until sufficient manual effort is applied to handle 58 to break the joint and the discs will be free of interengaging pressure irrespective of the operator's hold on handle 58 and without necessitating the manipulation of any additional securing means for retaining the handle in that position. Upon return movement of the handle sufficient to break the toggle, springs 33 will return the parts to the position shown in Figure 2, automatically engaging the discs.

Casing head 44 is attached to the body of the casing by studs or bolts 59 and, upon the removal of these bolts, the head and all of the parts mounted thereon are readily removable as a unit from the casing body, rendering the interior of the casing and the parts therein accessible for inspection, adjustment, repair and replacement.

Push ring 42 is apertured to freely receive studs 60 projecting inwardly from head 44 and, when the head is removed from the body of the casing, all of these parts are held in their proper angular relation relative to each other so that upon reassembly they will be in proper relation to the parts remaining in the casing. Head 44 seats an anti-friction end thrust bearing 61 (Figure 2) for shaft 18 and when the head and the parts carried thereon are removed this antifriction unit and outer race 41 of the push ring bearing come away from the head. The dotted line X—X in Figure 2 indicates the line of separation of the parts removed when head 44 is detached.

Elements 14, 15, 43 and 44 form a chamber in which the gearing and clutch parts operate protected from moisture, dust and other dirt which would tend to injure the mechanism. This is a feature which is particularly advantageous in mining machinery, such as that illustrated in the patent referred to, because of the difficult conditions under which the machinery operates. Preferably the chamber contains oil or other suitable lubricant further protecting the parts and contributing to the slippage of the friction discs on each other when subjected to torque substantially greater than that required to wind cable C on its drum. Accordingly, the motor driving shafts 13 and 18 may be left on when the mining machine is being jockeyed back and forth in a tunnel and the cable will be wound up by the reel drive as its effective length is decreased by movement of the machine towards the power source and the discs may slip over each other to permit the cable to be payed out by positive pull thereon manually or resulting from the travel of the machine away from the power source, thus increasing the effective length of the cable. During such shifting of the machine, the clutch may be maintained engaged. Obviously, when the machine is to remain substantially stationary for a considerable period, it would be unnecessary to continue to operate the cable take-up, and the clutch may be disengaged by moving handle 58 to the clutch disengaging position indicated in full lines in Figure 3.

The structure described attains the objectives indicated in the introductory portion of this specification, is well adapted for heavy duty because of its simplicity, and is adapted for use in coal mines, road machinery and other equipment exposed to dust and other foreign matter tending to injure the mechanism. The details of the construction may be varied substantially without departing from the spirit of the invention, and the exclusive use of those modifications coming within the scope of the claims is contemplated.

What is claimed is:

1. In a cable reel winding mechanism, a driven element, a driving element, means yieldingly thrusting said elements into frictional engagement with each other, parts for compressing said means, a casing structure forming a chamber enclosing said elements and parts, the interior of said chamber being sealed from the exterior but one wall of said chamber being detachable from the remainder of the chamber, there being oil in said chamber and about said elements, a manually operable control member mounted on the exterior of said wall, and an operable connection between said member and said ports for rendering said means ineffective, said wall, member and connection being removable as a unit from the remainder of said casing and from said elements and means to facilitate access to said elements and means.

2. In a mechanism of the class described, a casing, driving and driven parts enclosed therein and shiftable into position in which they engage and into position in which they are disengaged, yielding means for thrusting said parts into one of said positions, a device for freeing said parts from the thrust of said means and including an operating lever having a fixed fulcrum on said casing, a shifting lever having a fixed fulcrum on said casing, and elements having adjacent ends pivoted to each other and having spaced ends connected to said operating lever and to said shifting lever respectively and forming a toggle movable by said operating lever into a locked position and to free said parts of the thrust of said means and movable by said operating lever from locked position to accommodate engagement of said parts by said means.

3. In a mechanism of the class described, driving and driven parts to be interengaged, yielding means for thrusting said parts into interengagement, a device for freeing said parts from the thrust of said means and including a shifting lever having a fixed fulcrum, an operating lever having a fixed fulcrum, said levers being generally parallel and each having a relatively short arm and a relatively long arm, and a link having its ends pivoted to the outer end of the long arm of said shifting lever and to the outer end of the short arm of the operating lever respectively and forming with the latter-mentioned arm a toggle, movement of the operating lever in one direction actuating the toggle to free said parts of the thrust of said means and locking the toggle to hold said parts in said position until the lever is operated to break the toggle.

4. Clutch operating structure comprising a casing, a push ring in the casing for controlling the position of interengaging clutch elements therein, a yoke in the casing pivoted at one end on said casing, spaced elements intermediate the ends of the yoke for engaging the push ring, a shifting lever fulcrumed on said casing, a push rod connecting one arm of said lever to the other end of said yoke, an operating lever fulcrumed on the exterior of said casing, a link connecting one arm of said operating lever to the other arm of said shifting lever, said link and operating lever arm forming a toggle and movement of said operating lever in one direction first moving the shifting lever, push rod and yoke to actuate the push ring in one direction and hold it there until the operating lever is moved to break the toggle.

5. In a mechanism of the class described, a casing, driving and driven parts movable in said casing and relative to each other into interengaged position and into disengaged position, yielding means within said casing thrusting said parts into one of said positions, a push member for relieving said parts of the thrust of said means, a yoke extending transversely of the casing and fulcrumed thereon near one side of the casing and engaging said push member intermediate its ends, a shifting lever extending transversely of the casing and pivoted thereto intermediate its ends and having an operative connection at one end to the swinging end of said yoke, an operating handle lever fulcrumed on said casing, a link connecting an arm of said handle lever and the swinging end of said shifting lever, said link and operating lever arm forming a toggle for actuating said shifting lever to thrust said yoke against said push member and to hold said lever, yoke and push member in position with said parts free of said means until the toggle is broken by the operating lever.

6. In a mechanism of the class described, driving and driven parts shiftable into position in which they engage and into position in which they are disengaged, a thrust transmitting member movable to shift said parts into one of said positions, yielding means thrusting said member to shift said parts as described, a release device movable to resist the action of said means on said thrust transmitting member, a casing enclosing all of the above-mentioned mechanism and including a detachable head, a manually operable lever mounted on the exterior of said head, and elements mounted on said head and movable by said lever and including an element extending inwardly of said head and having operative contact with said release device, said head, lever and elements being removable as a unit from said casing to provide access to said parts and yielding means.

7. In a mechanism of the class described, driving and driven parts to be interengaged, yielding means for moving said parts into interengaging position, a release member for rendering said means ineffective, a casing enclosing all the above-mentioned elements and provided with a separable head, a manually operable device mounted on the exterior of said head, and elements on said head and engageable with said device and said release member, readily detachable elements securing said head to said casing, said head, device and connecting elements being removable as a unit from said casing upon detachment of said securing elements to provide access to said parts and yielding means.

8. In a cable reel winding mechanism, a driving member, a driven member, alternating coacting clutch discs associated respectively with said driving member and said driven member, means yieldingly thrusting said elements into frictional engagement with each other, structure shiftable to one position to render said means ineffective and to another position to permit said means to function, said means yieldingly holding said structure in the latter-mentioned position, said structure including a part selectively movable manually in opposite directions to shift said structure to either of said positions, said structure also including a device adapted to hold the structure in the first-mentioned position against the thrust of said yielding means but adapted to be readily released by manual pressure on said part.

9. In a cable reel winding mechanism, a driving member, a driven member, alternating coacting clutch discs associated respectively with said driving member and said driven member, means yieldingly thrusting said elements into frictional engagement with each other, structure shiftable to one position to render said means ineffective and to another position to permit said means to function, said means yieldingly holding said structure in the latter-mentioned position, said structure including a toggle and an operating part movable selectively manually in opposite directions to shift the toggle knuckle to opposite sides of a straight line between the outer ends of the toggle links, the toggle being locked when its knuckle is at one side of said line to hold said structure in said first-mentioned position against the thrust of said means, said structure being free to shift to the second-mentioned position when the knuckle is at the other side of said line.

10. In a mechanism of the class described, driving and driven members, a box-like structure with opposing end walls apertured to slidably receive said members, a group of interengageable rotatable clutch discs in said structure, successive discs being secured alternately to said driving and driven members respectively with a disc at one end of the group seated against one of said end walls, a backing plate within said structure having one side opposing a disc at the other end of said group and opposing an end of one of said members, said structure and backing plate being movable relative to each other axially of said members, pins slidable through the other of said end walls and provided with rigid followers, each with one side seated against said latter-mentioned end wall and with its other side forming a spring seat, springs compressed between the other side of said backing plate and said followers, and clutch control means, including a toggle movable to a locking position, to move said box-like structure relative to said backing plate to free said clutch discs from the thrust of said springs.

JOHN L. CLARKSON.

REFERENCES CITED

The following references are of record in the file of this patent:

UNITED STATES PATENTS

| Number | Name | Date |
|---|---|---|
| 879,005 | Rockstroh | Feb. 11, 1908 |
| 1,178,881 | Sessions | Apr. 11, 1916 |
| 1,281,741 | Zweighbergk | Oct. 15, 1918 |
| 1,375,956 | Ford | Apr. 26, 1921 |
| 1,702,116 | Hoffman | Feb. 12, 1929 |
| 1,847,112 | Jordon | Mar. 1, 1932 |
| 1,928,301 | Pierson | Sept. 26, 1933 |
| 2,285,860 | Jeffrey et al. | June 9, 1942 |

UNITED STATES PATENTS

| Number | Name | Date |
|---|---|---|
| 638,968 | Germany | Mar. 16, 1935 |